(12) United States Patent  
Tracht

(10) Patent No.: US 9,027,958 B2  
(45) Date of Patent: May 12, 2015

(54) VEHICLE SEAT ASSEMBLY WITH SIDE AIR BAG AND GUIDE PANEL WITH SPACED FORWARD ENDS FOR CREATING A SHEARING FORCE

(71) Applicant: Lear Corporation, Southfield, MI (US)

(72) Inventor: Michael L. Tracht, Altheim (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/144,861

(22) Filed: Dec. 31, 2013

(65) Prior Publication Data

US 2014/0191496 A1 Jul. 10, 2014

(30) Foreign Application Priority Data

Jan. 4, 2013 (DE) .......................... 10 2013 200 077

(51) Int. Cl.
*B60R 21/207* (2006.01)

(52) U.S. Cl.
CPC .................................... *B60R 21/207* (2013.01)

(58) Field of Classification Search
CPC ..................... B60R 21/207; B60R 2021/2076; B60R 21/2165; B60R 21/215; B60R 21/201
USPC ................................ 280/730.2, 728.3, 728.2
See application file for complete search history.

(56) References Cited

U.S. PATENT DOCUMENTS

| | | | |
|---|---|---|---|
| 5,860,673 A | 1/1999 | Hasegawa et al. | |
| 5,938,232 A | 8/1999 | Kalandek et al. | |
| 5,967,603 A * | 10/1999 | Genders et al. | 297/216.13 |
| 5,997,032 A | 12/1999 | Miwa et al. | |
| 6,045,151 A * | 4/2000 | Wu | 280/728.3 |
| 6,074,003 A | 6/2000 | Umezawa et al. | |
| 6,213,498 B1 | 4/2001 | Ghalambor et al. | |
| 6,293,580 B1 * | 9/2001 | Lachat et al. | 280/728.3 |
| 7,357,412 B2 | 4/2008 | Tracht et al. | |
| 7,458,603 B2 * | 12/2008 | Buono et al. | 280/728.2 |
| 7,543,847 B2 | 6/2009 | Tracht | |
| 7,695,064 B2 | 4/2010 | Thomas et al. | |

(Continued)

FOREIGN PATENT DOCUMENTS

| | | |
|---|---|---|
| DE | 102007011823 A1 | 9/2008 |
| WO | 0006426 A1 | 2/2000 |

(Continued)

OTHER PUBLICATIONS

German Office Action Dated Aug. 19, 2013, Application No. 10 2013 200 077.4, Applicant Lear Corporation, 9 Pages.

*Primary Examiner* — Karen Beck

(74) *Attorney, Agent, or Firm* — Brooks Kushman P.C.

(57) ABSTRACT

In at least certain embodiments, the vehicle seat assembly comprises a frame, a seat pad, a trim cover extending over at least part of the seat pad with the cover having a release seam, and an air bag assembly including an inflator and an air bag. In accordance with an embodiment, the air bag assembly includes an air bag guide associating the air bag assembly with the release seam, the air bag guide comprising a panel having an intermediate portion that wraps around the air bag assembly, a first end secured to the trim cover on a first side of the release seam and a second end secured to the trim cover on the first side of the release seam spaced a predetermined distance from the first end, the first end having a first width, the second end having a second width and the intermediate portion having a third width, with the sum of the first and second widths being equal to or greater than the third width.

20 Claims, 4 Drawing Sheets

(56) References Cited

U.S. PATENT DOCUMENTS

| | | |
|---|---|---|
| 7,731,226 B2 | 6/2010 | Zink |
| 7,954,842 B2 * | 6/2011 | Deppe et al. ............... 280/728.3 |
| 8,573,635 B2 * | 11/2013 | Festag et al. ............... 280/730.2 |
| 8,820,780 B2 * | 9/2014 | Thomas ..................... 280/730.2 |
| 2003/0098513 A1 | 5/2003 | Huang |
| 2006/0066078 A1 * | 3/2006 | Hofmann .................. 280/730.2 |
| 2009/0243266 A1 | 10/2009 | Smith |
| 2014/0191496 A1 * | 7/2014 | Tracht ....................... 280/730.2 |

FOREIGN PATENT DOCUMENTS

| | | |
|---|---|---|
| WO | 2012105956 A1 | 8/2012 |
| WO | 2012105957 A1 | 8/2012 |
| WO | WO 2012105957 A1 * | 8/2012 |

* cited by examiner

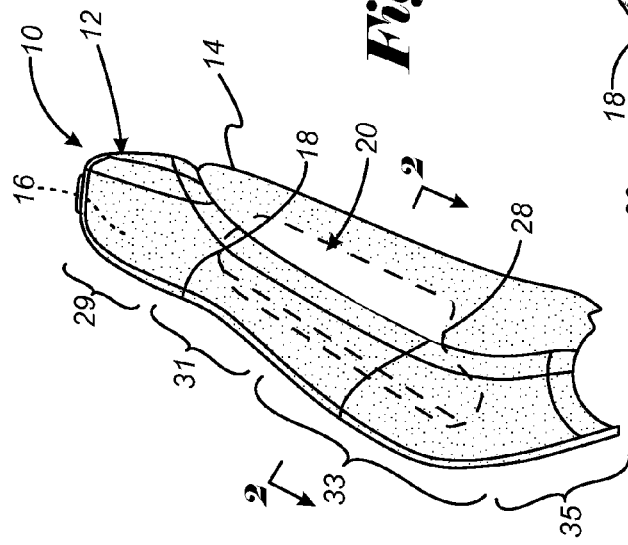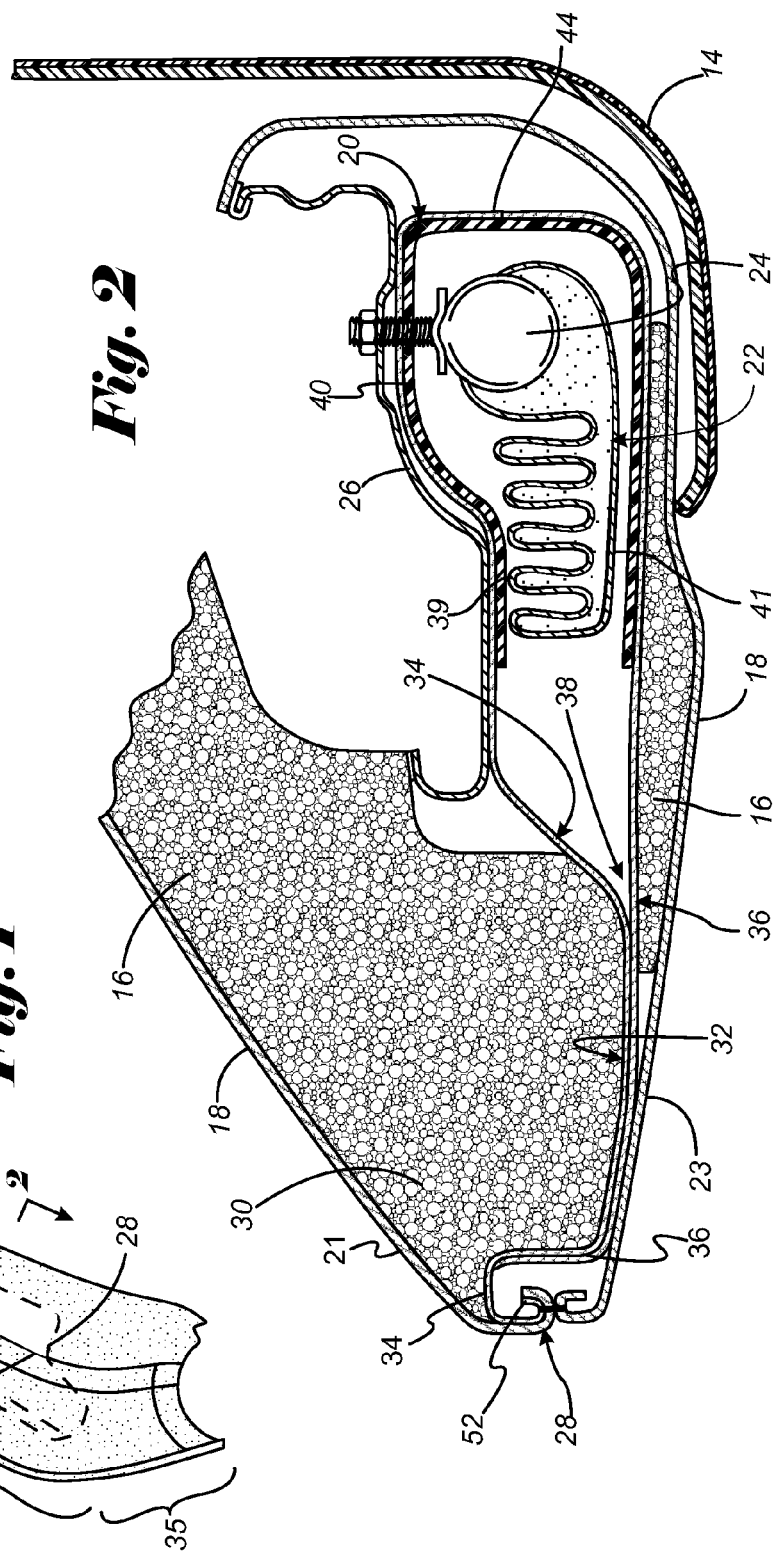

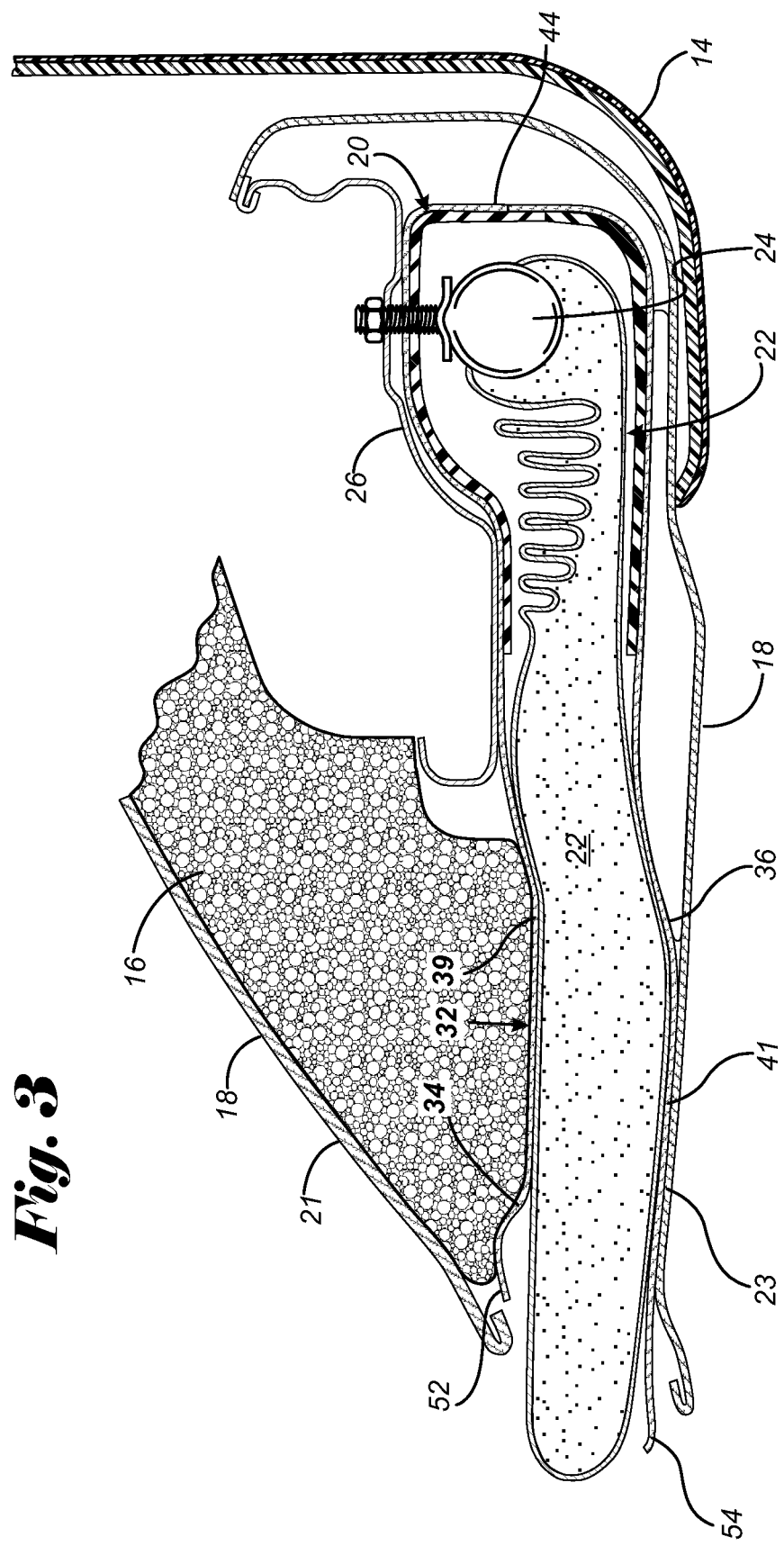

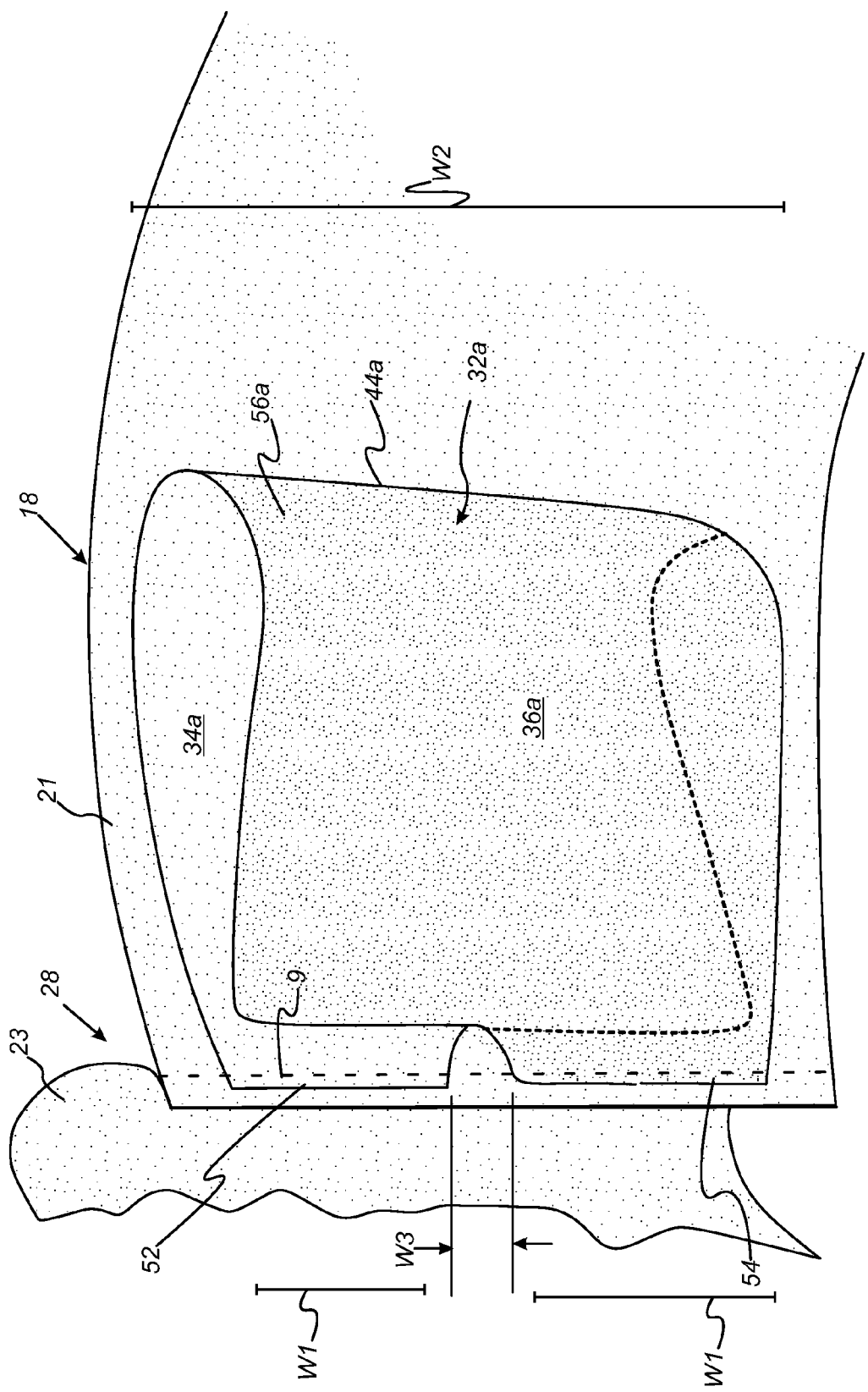

VEHICLE SEAT ASSEMBLY WITH SIDE AIR BAG AND GUIDE PANEL WITH SPACED FORWARD ENDS FOR CREATING A SHEARING FORCE

CROSS-REFERENCE TO RELATED APPLICATIONS

This application claims foreign priority benefits under 35 U.S.C. §119(a)-(d) to DE 10 2013 200 077.4, filed Jan. 4, 2013, the disclosure of which is hereby incorporated by reference in its entirety.

TECHNICAL FIELD

The present disclosure relates to a vehicle seat assembly, and in particular, to a seat assembly including an air bag having a guide panel with spaced forward ends for creating a shearing force on a release seam.

BACKGROUND

Vehicles can be equipped with side air bags, which may be in the form of an air bag disposed within a vehicle seat assembly. One limitation of air bags that are located within a seat assembly, is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness. Other limitations are that the incorporation of the air bag in the seat assembly should not cause discomfort or safety issues to occupants.

Prior vehicle seat assemblies equipped with side air bags and manufacturing methods are disclosed in U.S. Pat. Nos. 5,860,673, 5,997,032 and 6,045,151, for example.

SUMMARY

A vehicle seat assembly is provided. In at least one embodiment, the vehicle seat assembly comprises a frame, a seat pad adjacent the frame and having a main body portion for supporting an occupant, a trim cover extending over at least a part of the seat pad and having a release seam adjacent the seat pad, and an air bag assembly mounted on the frame within the trim cover in a spaced relationship from the release seam. In accordance with this embodiment, the air bag assembly includes an inflator and a folded air bag that is inflatable by the inflator to unfold and project outwardly from the seat assembly through the air bag release seam of the trim cover. Further in accordance with this embodiment, the air bag assembly includes an air bag guide associating the air bag assembly with the release seam, with the air bag guide comprising a panel having an intermediate portion that wraps around the air bag assembly, a first end secured to the trim cover on a first side of the release seam and a second end secured to the trim cover on the first side of the release seam spaced a predetermined distance from the first end, the first end having a first width, the second end having a second width, and the intermediate portion having a third width, the sum of the first and second widths being equal to or greater than the third width.

In another embodiment, the vehicle seat assembly comprises a frame, a seat pad adjacent the frame, a trim cover extending over at least a part of the seat pad, an air bag assembly mounted on the frame, and an air bag guide extending between and connecting the air bag assembly and the release seam. In at least this embodiment, the air bag guide comprises a panel having a first end secured to the trim cover on a first side of the release seam, a second end spaced from the first end and secured to the trim cover on the first side of the release seam, and an intermediate portion extending between the first and second ends, the first end having a top edge and the second end having a bottom edge, the distance extending between the top edge of the first end and the bottom edge of the second end being at least as wide as the widest portion of the intermediate portion.

In another aspect, a method of making a vehicle seat assembly is provided. In at least one embodiment, the method comprises providing a frame, mounting a seat pad on the frame, disposing a trim cover having a release seam over at least a portion of the seat pad and the frame, securing an air bag assembly adjacent the frame, and providing a flexible air bag guide and associating the air bag guide with the air bag assembly so the air bag guide extends between and connects the release seam and the air bag assembly. In accordance with this embodiment, the air bag guide comprises a first end secured to the trim cover on a first side of the release seam, a second end secured to the trim cover on the first side of the release seam and an intermediate portion that associates the first and second ends with the air bag assembly, the first end having a top edge and the second end having a bottom edge, and the distance between the top edge of the first end and the bottom edge of the second end being at least as long as the widest portion of the intermediate portion.

While exemplary embodiments in accordance with the disclosure are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 1 is a fragmentary side view of a portion of a seat assembly in accordance with an embodiment of the present disclosure;

FIG. 2 is a fragmentary cross-sectional view of a portion of a seat assembly shown in FIG. 1 taken along FIG. 2-2;

FIG. 3 is a view similar to FIG. 2 showing the air bag inflated;

FIG. 5 is a view similar to FIG. 4 showing another embodiment.

DETAILED DESCRIPTION

Figure 4:
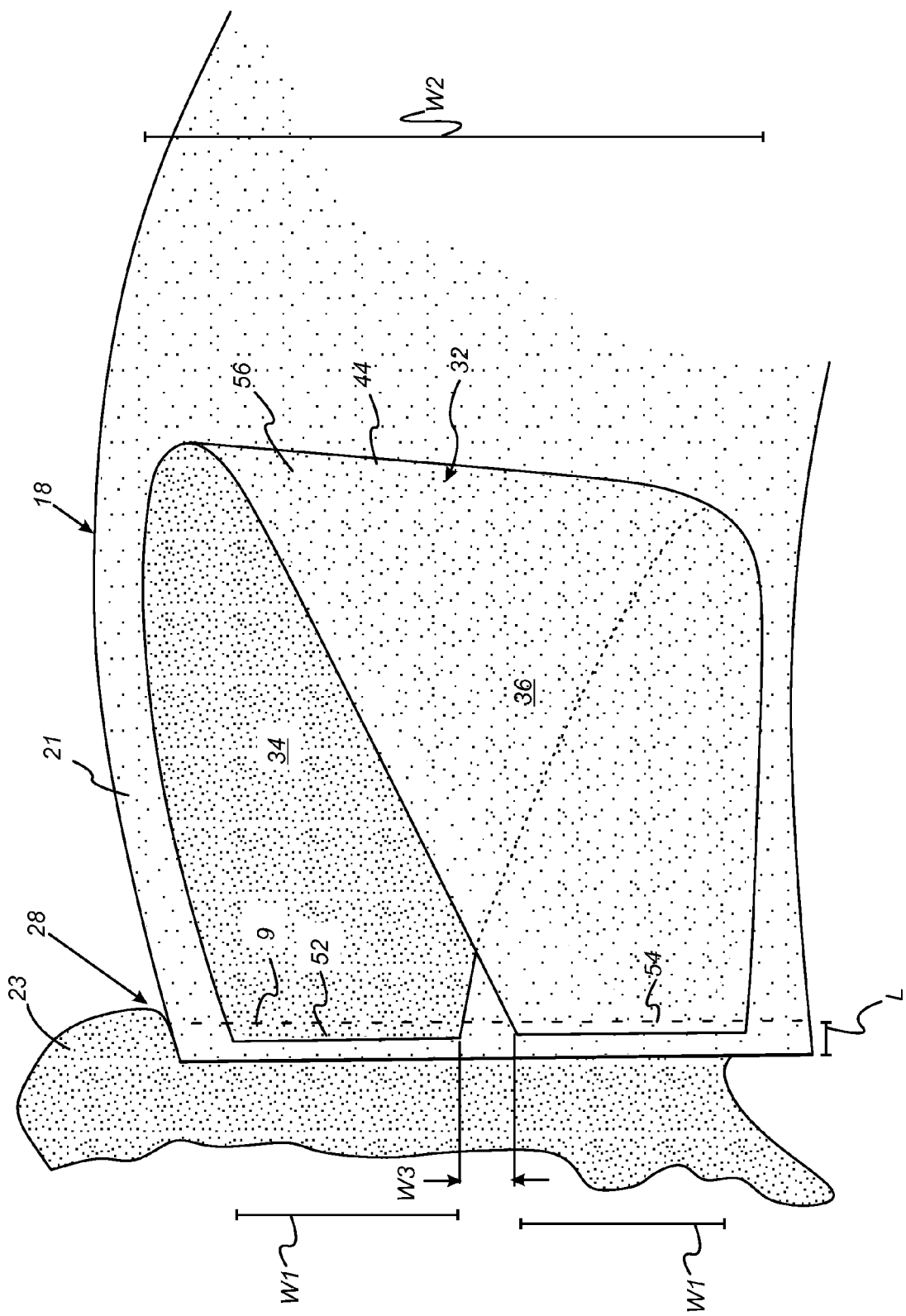
FIG. 4 is a perspective view of components of the seat assembly shown in FIG. 1 with certain components removed for illustrative purposes.

As required, detailed embodiments of the present disclosure are disclosed herein. However, it is to be understood that the disclosed embodiments are merely exemplary of the disclosure that may be embodied in various alternative forms. The figures are not necessarily to scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present disclosure.

Moreover, except where otherwise expressly indicated, all numerical quantities in this description and in the claims indicating amounts of materials or conditions of reactions and/or use are to be understood as modified by the word "about" in describing the broader scope of this disclosure. Practice within the numerical limits stated is generally preferred. Also, unless expressly stated to the contrary, the description of a group or class of materials as suitable preferred for a given purpose in connection with the disclosure implies that mixtures of any two or more members of the group or class may be equally suitable or preferred.

The present disclosure describes various vehicle seat configurations that include an inflatable air bag assembly. Several specific embodiments are set forth in the following description and in the Figures to provide a thorough understanding of certain embodiments according to the present disclosure. As those of ordinary skill in the art will understand, one or more features of an embodiment illustrated and described with reference to any one of the Figures may be combined with features illustrated in one or more other Figures to produce embodiments that are not explicitly illustrated or described. In addition, other embodiments may be practiced without one or more of the specific features explained in the following description.

FIG. 1 shows a portion of an exemplary seat assembly 10 in accordance with the present disclosure. The illustrated seat assembly 10 includes a seat back 12, and seat pad 16 covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can optionally be provided in the rear area of the seat assembly 10 to provide support and/or for aesthetics.

In at least one embodiment, the seat pad 16 is made from a molded polymeric material, such as a polyurethane foam as is shown in FIG. 2. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. The air bag assembly 20 can be mounted to a bracket and/or could include a separate attachment bracket. In at least the illustrated embodiment, the air bag assembly 20 also includes an optional housing 40 which at least partially surrounds the air bag 22 and the inflator 24.

Also shown in FIG. 2 is a portion of a seat frame 26 which can be used for mounting the seat assembly 10 to a vehicle. In at least the illustrated embodiment, the seat pad 16 is disposed inboard of the support portion of the frame 26 and the air bag assembly 20 and may be directly attached to the frame 26 at various points. The seat frame 26 can be made of any suitable material, such as metal, plastic, rigid foam, or a composite such as carbon fiber disposed in a resin matrix.

In at least the illustrated embodiment, the trim cover 18 includes a first or front panel 21 and a second or side panel 23 that cooperate to form an air bag release seam 28 which in at least one embodiment is adjacent to a side 30 of the seat pad 16. It should be understood that the location of the release seam 28 can vary as desired. In at least one embodiment, the release seam 28 is 40 to 70 cm in length, but can be any suitable length. Referring to FIG. 1, in at least one embodiment the release seam 28 extends over a head protection area 29, a shoulder protection area 31, a thorax protection area 33, and a pelvis protection area 35. These areas 29, 31, 33 and 35 generally correspond with the respective body parts of an average sized vehicle occupant. That is that the respective deployment areas 29-35 are generally disposed adjacent the respective body parts (i.e., head, shoulder, thorax and pelvis) of an average sized vehicle occupant.

Referring again to FIG. 2, in the illustrated embodiment, the air bag assembly 20 is located within the trim cover 18 and is mounted on the frame 26 adjacent the air bag release seam 28 in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

With continuing reference to FIG. 2, an air bag guide of the seat back component, generally indicated by 32, is associated with the air bag assembly 20. In at least one embodiment, the air bag guide 32 is a unitary sheet and includes an inner panel 34 and an outer panel 36. The air bag guide 32 is made of any suitable sheet material effective to protect the seat pad 16 during deployment of the air bag 22. For example, a woven or non-woven cloth material, which may include natural or synthetic materials such as nylon. One material that is found to be effective is a polyester material, of the type from which the air bag 22 may be manufactured. The sheet material may be flexible or elastic. Regardless of the type of material used to make the air bag guide 32, the use of the air bag guide 32 can be helpful in reducing friction on the air bag 22 as it deploys. Although a polymer such as nylon may be particularly beneficial, even a fleece material will help reduce the friction on the air bag 22. This is because the air bag guide 32 inhibits contact between the deploying air bag 22 and the seat pad 16 and helps to prevent particles from separating from the seat pad and being introduced into the vehicle compartment.

In at least one embodiment, the inner and outer panels 34, 36 of the air bag guide 32 respectively meet at a rear end 44 of the air bag guide, thereby forming a unitary air bag guide. The rear end 44 of the air bag guide 32 wraps around the housing 40 to effectively associate the air bag guide 32 with the housing 40 of the air bag assembly 20.

In the illustrated embodiments, the inner and outer panels 34, 36 of the air bag guide 32 respectively include front ends 52, 54 attached to the trim cover 18 adjacent the release seam 28. As can be seen in FIG. 4, the front ends 52, 54 are spaced from each other a relatively small predetermined distance W3. As will be discussed further below, this spacing W3 helps to direct deployment force of the air bag 22 upon deployment. In at least the embodiment illustrated in FIG. 4, the front ends 52, 54 are narrower than the rear end 44 of the air bag guide 32. As such, the panels 34, 36 of the air bag guide 32 illustrated in the embodiment shown in FIG. 4 have a tapered shape. However, it should be understood that the panels can have any suitable shape. The air bag assembly 20 is not shown in FIG. 4 for illustrative purposes.

As best shown in FIG. 4, in at least one embodiment, the panels 34, 36 of the air bag guide 32 have a trapezoidal shape, however any suitable shape can be. In at least one embodiment, the front ends 52, 54 of the guide 32 have a width W1 of 3 to 50, in other embodiments of 6 to 40 cm, and in yet other embodiments of 15 to 30 cm. The front ends 52, 54 are any suitable size to enable the panels 34, 36 to be secured to the trim cover 18 at the release seam 28 to direct a targeted opening of the release seam. In at least one embodiment, the front ends 52, 54 have a length L of 3 to 15 mm, in other embodiments of 4 to 12 mm, and in yet other embodiments of 5 to 10 mm. The length L is measured from the front of a respective panel 34, 36 to the stitching 9. While the front ends 52, 54 are shown in FIG. 4 to have a rectangular shape, it should be understood that the front ends 52, 54 could have any suitable shape, such as triangular, half circle, square, etc.

In at least one embodiment, the guide 32 has a length, from front end 52 to front end 54 of 10 to 50 cm, in other embodiments of 20 to 45 cm, and in yet other embodiments of 25 to 40 cm. The guide 32 has an intermediate portion 56, extending between and connecting front ends 52 and 54, having any suitable width along its length with its greatest width being indicated as W2. While not necessarily always the case, in at least one embodiment the greatest width W2 of intermediate portion 56 is located at the rear end 44 of the intermediate portion. In at least one embodiment, the width W2 is the width of the air bag assembly 20. In at least some embodiments, the width W2 of the intermediate portion 56 is at least the same as, and in other embodiments is longer than, the vertical length of the air bag assembly 20 and/or the inflator 24 and/or the bracket securing the inflator 24 to the seat. In at least certain embodiments, the intermediate portion 56 has a width W2 that is greater than the width W1 of one or both of front ends 52 and 54, however the sum of the widths W1 is greater than width W2. In at least one embodiment, the intermediate portion 56 has a width W2 of 5.2 to 60 cm, in other embodiments of 10 to 55 cm, and in yet other embodiments of 20 to 50 cm. In at least one embodiment, the intermediate portion 56 comprises 40% to 95% of the length of the guide 32, in other embodiments 50% to 90% of the length of the guide, and in yet other embodiments 55% to 85% of the length of the guide.

As set forth above, the sum of W1 of the front end 52 and W1 of the front end 54 is equal to or greater than width W2, i.e., W1+W1≥W2. This helps to reduce the deployment force directed to where the panels 34, 36, and specifically the front ends 52, 54, of the panels 34, 36 of the guide 32, are sewn into, or otherwise secured to the release seam 28 of the trim cover 18.

As discussed, above, the front ends 52, 54 of the panels 34, 36 are secured to the release seam 28 on the same side of the release seam, i.e., on the same trim cover panel, and are spaced apart from each other a predetermined distance. In at least one embodiment, as best shown in FIG. 2, the front ends 52, 54 of the guide 32 are spaced apart, as shown by W3 0 to 5 mm, in other embodiments 1 to 5 mm, and in yet other embodiments, 1.5 to 4 mm. The distance W3 is measured from the bottom edge of one front end, such as front end 52, to the top edge of the lower adjacent front end, such as front end 54. The spacing and the size of the front ends 52, 54 help to direct force of the air bag guide 32 to the release seam 28 a predetermined location to facilitate opening the release seam 28 at the predetermined location first. Specifically, the deployment force of the deploying air bag will be directed at the space W3 on the release seam 28 between the front ends 52, 54. This is because securement of the front ends 52, 54 to the trim cover 18 creates reinforced portions of the trim cover 18 so that the length of the release seam 28 between the reinforced portions will expand allowing the stitching 9 to rupture at that predetermined area to open the release seam at that predetermined area first. In at least one embodiment, the spacing W3 of the front ends 52, 54 is set to be as small as practical while enabling the front ends 52, 54 to be sewn to the trim cover in the sewing plant. This helps to direct the force of the deploying air bag 22 to the predetermined location W3 of the release seam 28 so that the release seam can open quickly. Such an arrangement can reduce a fraction of a millisecond to a few milliseconds from the time required to open the release seam 28, which can normally take 1 to 6 milliseconds. Also, by directing, the concentration of the force generated by the deploying air bag 22 to predetermined location W3 of the release seam 28, a relatively thick stitching 9 can be used for forming the release seam 28. This can help to reduce scrap-rate and facilitate manufacture of the seat assembly as the release seam 28 will be less susceptible to accidental breakage during positioning of the trim cover 18 over the pad 16 during assembly and over the life-cycle of the seat assembly 10.

As discussed above, in at least one embodiment, the sum of the widths W1 of the front ends 52, 54 is equal to or greater than the maximum width W2 of the intermediate portion 56. In at least one embodiment, the sum of W1 is equal to or greater than the vertical length of the air bag assembly 20, which in some embodiments can include a separate attachment bracket. The deployment of the air bag 22 generates a high amount of force along the intermediate portion 56 of the air bag guide 32. By the sum of W1 being equal to or greater than W2 and/or the length of the air bag assembly 20, the force generated by the deploying air gag 22 is dissipated by the panels 34, 36 to effectively produce a relatively small deployment force along the front ends 52, 54 and direct a relatively high force to the space W3, resulting in the air bag 22 first opening the release seam 28 in the area W3 between the front ends 52, 54.

In the illustrated embodiments, the front ends 52, 54 are adjacent each other and face in the same direction, however it should be understood that the ends could also be attached to the trim cover such that they are adjacent each other and face in opposite directions. The front ends 52, 54 of the inner and outer panels 34, 36 can be attached to the trim cover 18 by any suitable manner. For instance, the ends 52, 54 can be attached to the trim cover 18 adjacent the tear seam 28 via stitching, ultrasonic welding, adhesive, etc., among other suitable manners.

As can be seen in the illustrated embodiments, the front ends 52, 54 of the panels 34 and 36 are attached to the trim cover 18 on the same side of the release seam 28. While the illustrated embodiment shows the air bag guide 32 attached to the trim cover 18 on the front trim panel 21 side of the release seam 28, it should be understood that the arrangement could be laterally reversed, i.e., the mirror image, such that the panels 34 and 36 could be attached to the side trim panel 23 of the release seam 28.

As illustrated in FIG. 4, stitching 9 can be used to connect the front ends 52 and 54 of the panels 34 and 36 to one of the panels 21 and 23 of the trim cover 18 and to connect the panels 21 and 23 to each other to form the release seam 28. The stitching 9 can be applied in any suitable manner.

In at least one embodiment, the air bag guide 32 is effective to inhibit contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag.

In at least one embodiment, the inner and outer panels 34 and 36 of the air bag guide 32 form a deployment channel 38 for the air bag 22. As best shown in FIGS. 2-3, the deployment channel 38 is oriented to facilitate deployment of the air bag 22 through the seam 28 in the trim cover 18. The panels 34 and 36, and in particular the front ends 52, 54 by their relative movement, aid in tearing the release seam 28 creating a shearing force to concentrate and direct the deployment force of the air bag 22 to space W3 between the front ends 52, 54 at the release seam 28. In certain embodiments, the trim cover 18 can be made of a material that is more stretchable than the panels 34, 36.

Upon deployment of the air bag assembly 20, as shown schematically in FIG. 3, the deploying air bag 22 causes relative movement of the flexible inner and outer panels 34 and 36 away from each other which then provide a guiding function of the unfolding air bag 22 as it moves between the panels toward the air bag release seam 28 and eventually tears open the release seam for outward projection of the air bag to provide the occupant protection. Furthermore, as the air bag 22 deploys through the deployment channel 38, the air bag guide 32 acts as a blocking member that forms a barrier on two sides 39, 41 of the air bag 22, thereby inhibiting contact between the air bag 22 and the seat pad 16. Thus, the seat pad 16 is moved away from the air bag 22 as it deploys through the deployment channel 38.

As best shown in FIG. 3, the attachment of the front ends 52, 54 to the seam 28 helps to facilitate deployment of the air bag 22 through the seam 28. This is because the deployment channel 38 opens as the air bag 22 is deployed, and this causes the deploying air bag 22 to exert an outward force on the panels 34, 36 at the seam 28; this creates a shearing force at the location W3 of the front ends 52, 54 on the seam 28 between the front ends 52, 54 which helps to open the seam 28 first at space W3 between the front ends 52, 54 to provide an easy exit for the air bag 22. Also attachment of the panels 34, 36 to the release seam 28 helps to ensure that the air bag 22 will deploy in the predetermined desired manner through the seam 28. Because the panels 21, 23, 34 and 36 are connected to the release seam 28, relatively consistent deployment of the air bag 22 in seat assemblies 10 employing the air bag guide 32 can be achieved.

In the embodiment illustrated in FIG. 4, the intermediate portion 56, and thus the panels 34, 36 of the air bag guide 32, have a generally tapered shape from the rear end 44 of the air bag guide 32 towards the front ends 52, 54.

It should be understood that any suitable shape for the intermediate portion 56 of the air bag guide could be employed. For instance, a generally square- or rectangular-shaped intermediate portion 56a could be employed, as best shown in FIG. 5. Referring to FIG. 5, another embodiment of an air bag guide 32a is shown. This embodiment is similar in construction, manufacture, and operation to the embodiment shown in FIGS. 2-4. As with FIG. 4, the air bag assembly 20 is not shown for illustrative purposes.

In the embodiment shown in FIG. 5, the air bag guide 32a is generally similar to the air bag guide 32 shown in FIG. 4, except that the intermediate portion 56a is shaped differently than the intermediate portion 56 of the air bag guide 32 of FIG. 4. In the embodiment illustrated in FIG. 5, the intermediate portion 56a, and thus the panels 34a, 36a of the air bag guide 32a, have a generally rectangular or square shape that extends from the rear end 44a of the air bag guide 32a towards the front ends 52a, 54a, such that the front ends 52a, 54a of the air bag guide 32a extend in the shape of small rectangles from the intermediate portion 56a. In at least one embodiment, the intermediate portion 56a has a width W2 of 25 to 60 cm, in other embodiments of 30 to 55 cm, and in yet other embodiments of 35 to 50 cm. The panels 34a, 36a, being of a rectangular or square shape, provide certain beneficial effects over other shapes, such relatively high fragmentation prevention, relatively low friction by the deploying airbag, and relatively easy airbag assembly mounting.

In at least certain embodiments, the air bag guides 32 and 32a of the disclosure provide for selective opening of the release seam 28 in a certain area W3 prior to the opening of other areas. This could be done by location of the ends 52, 54 at particular locations along the release seam 28. For instance, if it was desired to have the thorax area 33 open before the other area 29, 31 and 35 open, the front ends 52, 54 would be secured such that the space W3 would be located at thorax area 33. The deployment of the air bag 22 would cause the thorax area 33 to open first and relatively quickly since the force from the deploying air bag 22 would cause the front ends 52, 54 to shear the space W3 between them. In this way, the air bag guides 32 and 32a can provide a more tailored opening pattern and quicker opening than has been previously available.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. A vehicle seat assembly comprising:
a frame;
a seat pad adjacent the frame, the seat pad having a main body portion for supporting an occupant;
a trim cover extending over at least a part of the seat pad, the trim cover having a release seam adjacent the seat pad;
an air bag assembly mounted on the frame within the trim cover in a spaced relationship from the release seam, the air bag assembly including an inflator and a folded air bag that is inflatable by the inflator to unfold and project outwardly from the seat assembly through the release seam of the trim cover; and
an air bag guide associating the air bag assembly with the release seam, the air bag guide comprising a panel having an intermediate portion that wraps around the air bag assembly, a first end secured to the trim cover on a first side of the release seam and a second end secured to the trim cover on the first side of the release seam spaced a predetermined distance from the first end, the first end being continuous and having a first width, the second end being continuous and having a second width and the intermediate portion having a third width, the sum of the first and second widths being equal to or greater than the third width.

2. The vehicle seat assembly of claim 1, wherein the first end has a top edge and a bottom edge and the second end has a top edge and a bottom edge, the distance between the top edge of the first end and the bottom edge of the second end being at least as long as the third width.

3. The vehicle seat assembly of claim 2, wherein the predetermined distance is the distance between the bottom edge of the first end and the top edge of the second end, the predetermined distance being no more than 5 mm.

4. The vehicle seat assembly of claim 2, wherein the third width is no more than 60 cm.

5. The vehicle seat assembly of claim 3, wherein the first end of the air bag guide secured to the trim cover forms a first reinforced trim cover portion along the release seam and the second end of the air bag guide secured to the trim cover forms a second reinforced trim cover portion along the release seam spaced from the first reinforced trim cover portion the predetermined distance such that a non-reinforced portion of the trim cover of the predetermined distance exists between the first and second reinforced portions, deployment of the air bag will cause the release seam to tear first at the non-reinforced portion of the trim cover due to a shearing force caused by relative movement of the first and second reinforced trim cover portions during air bag deployment.

6. The vehicle seat assembly of claim 1, wherein the first and second widths are each independently 3 to 50 cm, and the third width is 5.2 to 60 cm.

7. The vehicle seat assembly of claim 1, wherein the third width of the intermediate portion is greater than each of the widths of the first and second widths, and the panel has two opposed portions with each side having a trapezoidal shape.

8. The vehicle seat assembly of claim 1, wherein the intermediate portion has two opposed sides with each side having a main body portion comprising a rectangular shape and a minor body portion having a rectangular shape and extending from the main body portion, with each minor body portion comprising a respective one of the first and second ends.

9. The vehicle seat assembly of claim 1, wherein the trim cover comprises a front trim panel and a side trim panel connected to each other to form the release seam, the first and second ends of the guide panel being connected to the release seam, and the first and second widths independently being 3 to 50 cm and the first and second ends being spaced between 1 and 5 mm from each other on the release seam.

10. The vehicle seat assembly of claim 9, wherein the third width is 5.2 to 60 cm, and the first end has a top edge spaced from a bottom edge of the second end by a distance greater than the third width.

11. The vehicle seat assembly of claim 1, wherein the sum of the widths of the first and second ends of the guide panel is greater than the vertical length of the air bag assembly.

12. A vehicle seat assembly comprising:
a frame;
a seat pad adjacent the frame;
a trim cover extending over at least a part of the seat pad, the trim cover having a release seam adjacent the seat pad;
an air bag assembly mounted on the frame, the air bag assembly including an inflator and a folded air bag that is inflatable by the inflator to unfold and project outwardly from the seat assembly; and
an air bag guide extending between and connecting the air bag assembly and the release seam, the air bag guide comprising a panel have a first end secured to the trim cover on a first side of the release seam, a second end spaced from the first end and secured to the trim cover on the first side of the release seam, and an intermediate portion extending between the first and second ends, the first end being made of sheet material extending continuously between a top edge of the first end and a bottom edge of the first end and the second end being made of the sheet material extending continuously between a top edge of the second end and a bottom edge of the second end, the distance extending between the top edge of the first end and the bottom edge of the second end being at least as wide as the widest portion of the intermediate portion.

13. The vehicle seat assembly of claim 12, wherein the first end has a first width extending between the top and bottom edges of the first end, the second end has a second width extending between the top and bottom edge of the second end and the intermediate portion has a third width, the sum of the first and second widths being at least equal to the third width.

14. The vehicle seat assembly of claim 13, wherein the intermediate portion has a portion having a width greater than each of the widths of the first and second widths.

15. The vehicle seat assembly of claim 14, wherein the distance between the top edge of the first end and the bottom edge of the second end is longer than the third width.

16. The vehicle seat assembly of claim 14, wherein the third width is less than 60 cm.

17. The vehicle seat assembly of claim 14, wherein the bottom edge of the first end and the top edge of the second end are spaced apart from each other by no more than 5 mm.

18. A method of making a vehicle seat assembly, said method comprising:
providing a frame;
mounting a seat pad on the frame;
disposing a trim cover having a release seam over at least a portion of the seat pad and the frame;
securing an air bag assembly adjacent the frame, the air bag assembly including an air bag that is inflatable; and
providing a flexible air bag guide made of a sheet material and associating the air bag guide with the air bag assembly so the air bag guide extends between and connects the release seam and the air bag assembly, the air bag guide comprising a first continuous end of the sheet material secured to the trim cover on a first side of the release seam, a second continuous end of the sheet material secured to the trim cover on the first side of the release seam and an intermediate portion that associates the first and second continuous ends with the air bag assembly, the first continuous end having a top edge and the second continuous end having a bottom edge, and the distance between the top edge of the first continuous end and the bottom edge of the second continuous end being at least as long as the widest portion of the intermediate portion.

19. The method of claim 18, wherein the intermediate portion extends between and connects the first and second continuous ends of the sheet material, the intermediate portion having a width greater than the width of the first continuous end.

20. The method of claim 18, wherein the first continuous end has a bottom edge and the second continuous end has a top edge, the bottom edge of the first continuous end being spaced from the top edge of the second continuous end by no more than 5 mm.

* * * * *